United States Patent [19]

Miyoshi et al.

[11] Patent Number: 4,745,017
[45] Date of Patent: * May 17, 1988

[54] MAGNETIC RECORDING MEDIUM

[75] Inventors: Takahito Miyoshi; Masahiro Utumi; Kenichi Masuyama; Toshimitu Okutu; Masaaki Fujiyama, all of Kanagawa, Japan

[73] Assignee: Fuji Photo Film Co., Ltd., Kanagawa, Japan

[*] Notice: The portion of the term of this patent subsequent to Jul. 1, 2003 has been disclaimed.

[21] Appl. No.: 616,761

[22] Filed: Jun. 4, 1984

[30] Foreign Application Priority Data

Jun. 3, 1983 [JP] Japan ................................. 58-99043

[51] Int. Cl.$^4$ .............................................. G11B 5/70
[52] U.S. Cl. ................................... 428/141; 427/131; 428/323; 428/336; 428/408; 428/694; 428/900
[58] Field of Search ............... 428/408, 323, 336, 694, 428/332, 900, 141; 427/128, 131

[56] References Cited

U.S. PATENT DOCUMENTS

| | | | |
|---|---|---|---|
| 4,135,031 | 1/1979 | Akashi et al. | 428/323 |
| 4,414,270 | 11/1983 | Miyoshi et al. | 428/900 |
| 4,474,843 | 10/1984 | Miyoshi et al. | 428/694 |
| 4,598,014 | 7/1986 | Miyoshi et al. | 428/900 |

Primary Examiner—Paul J. Thibodeau
Attorney, Agent, or Firm—Sughrue, Mion, Zinn, Macpeak, and Seas

[57] ABSTRACT

A magnetic recording medium which comprises a non-magnetic support having on the surface side thereof a magnetic recording layer and on the opposite side thereof a backing layer is disclosed. The backing layer contains carbon black and a binder and has a thickness of 2 $\mu$m or less. The carbon black is composed of fine-grained carbon black having a mean grain size of 10 to 30 m$\mu$ and coarse-grained carbon black having a mean grain size of 100 to 150 m$\mu$. In the backing layer the ratio of the content of carbon black to the binder ranges from 1:0.5 to 1:3.5 by weight.

6 Claims, No Drawings

MAGNETIC RECORDING MEDIUM

FIELD OF THE INVENTION

The present invention relates to a magnetic recording medium and more particularly, to a magnetic recording medium which possesses excellent electromagnetic transformation characteristics, a small coefficient of friction and good running durability.

BACKGROUND OF THE INVENTION

In recent years magnetic recording media for audio, video or computer use which enable a large amount of information to be recorded in a small area thereof have been required. In addition, a smoothing finish has been added to the surfaces of their magnetic layers for the purpose of improvement upon the sensitivity, (especially, in a high frequency region), and that, they are formed into thin tapes having a thickness of about 20 $\mu$m or less. Accordingly, their backing layers are also thin, and tend to come off, at least partially. Further, thinning magnetic tapes results in lowering their overall strength, which has adverse effects upon running durability, take-up characteristics, drop out, fluctuation of output and so on.

SUMMARY OF THE INVENTION

A primary object of the present invention is to provide a magnetic recording medium which causes no increase in a coefficient of friction and no generation of shavings and the like, and possesses excellent running durability.

Another object of the present invention is to provide a magnetic recording medium having a backing layer which does not impair S/N characteristics of the magnetic tapes and metal thin film type of magnetic tapes.

The above-described objects are attained with a magnetic recording medium which comprises a non-magnetic support having on the surface side thereof a magnetic recording layer and on the opposite side thereof a backing layer containing carbon black and a binder and the backing layer having a thickness of 2 $\mu$m or less, with the carbon black being composed of fine-grained carbon black having a mean grain size of 10 to 30 m$\mu$ and coarse-grained carbon black having a mean grain size of 100 to 150 m$\mu$, and with the backing layer having a ratio of the content of the carbon black to that of the binder ranging from 1:0.5 to 1:3.5 by weight.

DETAILED DESCRIPTION OF THE INVENTION

A ratio of fine-grained carbon black having a mean grain size of 10 to 30 m$\mu$ to coarse-grained carbon black having a mean grain size of 100 to 150 m$\mu$ ranges preferably from 99.5:0.5 to 50:50, more particularly from 99:1 to 60:40.

The fine-grained carbon black measuring 10 to 30 m$\mu$ in mean grain size can lower surface resistance of the backing layer and makes it possible for the light permeability of the backing layer to be set at a low value. These points are of great advantage to generally used, coated type magnetic tapes, especially to video tapes of VHS type. In addition, the fine-grained carbon black measuring 10 to 30 m$\mu$ in mean grain size has an effect of retaining a lubricant which is transferred to the backing layer from the magnetic layer when the tape is taken up on a reel, or which has been present from the first in the backing layer by means of forming an overcoat on the backing layer or incorporating it into the backing layer through kneading with other constituents. This lubricant-retaining effect of the fine-grained carbon black contributes to reduction of the coefficient of friction.

On the other hand, carbon black measuring 100 to 150 m$\mu$ in mean grain size has a function as a solid lubricant. Addition of the carbon black of this kind brings about a great improvement in running durability.

Specific examples of fine-grained carbon black (10 to 30 m$\mu$) and those of coarse-grained carbon black (100 to 150 m$\mu$) which can be used in the present invention are set forth in Table 1.

TABLE 1

| Trade Name | Mean Grain Size (m$\mu$) | Maker |
| --- | --- | --- |
| Asahi #80 | 23 | Asahi Carbon Co., Ltd. |
| Asahi #70 | 27 | " |
| Seast 6H | 24 | Tokai Electric Mfg. Co., Ltd. |
| Seast 6 | 24 | Tokai Electric Mfg. Co., Ltd. |
| Seagal 600 | 23 | Tokai Electric Mfg. Co., Ltd. |
| Seast 5H | 26 | Tokai Electric Mfg. Co., Ltd. |
| Seast 3H | 28 | Tokai Electric Mfg. Co., Ltd. |
| Seast 3 | 28 | Tokai Electric Mfg. Co., Ltd. |
| Seast H | 28 | Tokai Electric Mfg. Co., Ltd. |
| Seagal 300 | 27 | Tokai Electric Mfg. Co., Ltd. |
| Seast 116 | 30 | Tokai Electric Mfg. Co., Ltd. |
| Diablack A | 18 | Mitsubishi Chemical Industries, Ltd. |
| Diablack I | 21 | Mitsubishi Chemical Industries, Ltd. |
| Diablack II | 23 | Mitsubishi Chemical Industries, Ltd. |
| Diablack H | 30 | Mitsubishi Chemical Industries, Ltd. |
| Diablack SH | 30 | Mitsubishi Chemical Industries, Ltd. |
| Vulcan XC-72 | 30 | Cabot Corp. |
| Conductex SC | 17 | Columbian Carbon Co. |
| Asahi | | |
| #35 | 116 | Asahi Carbon Co., Ltd. |
| #SL | 102 | Hokutan Carbon Co., Ltd. |
| #20 | 118 | " |

The backing layer of the present invention has a thickness of 2 $\mu$m or less, preferably 0.5 to 1.5 $\mu$m, and preferably has such a smooth surface that its center line, average roughness Ra of 0.024 $\mu$m or less under a cutt-off condition of 0.08 mm. This is because so far as the backing layer has the surface smoothness of the above-described degree, transfer of unevenness from the backing layer onto the magnetic layer may be left out of consideration.

Binders which can be used in the backing layer include those known in this art, e.g., thermoplastic resins, thermosetting resins, reactive resins and mixtures thereof as described in U.S. Pat. No. 4,414,270. Specifically, the binder can be selected from resins as set forth below, and it is to be desired that such resins should have a glass transition temperature Tg not lower than 40° C., more preferably not lower than 60° C., in an independent state or in a mixture of two or more thereof.

Specific examples of thermoplastic resins which can be employed include vinyl chloride-vinyl acetate copolymers, vinyl chloride-vinylidene chloride copolymers, vinyl chloride-acrylonitrile copolymers, acrylic acid esteracrylonitrile copolymers, acrylic acid ester-vinylidene chloride copolymers, acrylic acid ester-styrene copolymers, methacrylic acid ester-acrylonitrile copolymers, methacrylic acid ester-vinylidene chloride copolymers, methacrylic acid ester-styrene copolymers, urethane elastomers, polyvinyl fluoride, vinylidene chloride-acrylonitrile copolymers, butadiene-acrylonitrile copolymers, polyamide resins, polyvinyl butyral, cellulose resins (such as cellulose acetate butyrate, cellulose diacetate, cellulose propionate, nitrocellulose, etc.), styrene-butadiene copolymers, polyester resins, chlorovinyl ether-acrylic acid ester copolymers, amino resins, various resins of rubber type and so on. Of these, vinyl chloride-vinyl acetate copolymers, urethane elastomers, cellulose resins, vinyl chloridevinylidene chloride resins, polyester resins, and styrenebutadiene copolymers are preferred. Most preferred examples include urethane elastomers, cellulose resins and polyester resins.

Specific examples of thermosetting resins or reactive resins which can be employed include phenol resins, epoxy resins, curable type polyurethane resins, urea resins, melamine resins, alkyd resins, acryl type reactive resins, polyisocyanates, polyamines and so on. Of these, phenol resins, epoxy resins and polyisocyanates are preferred, with polyisocyanates being most preferred.

A preferable ratio of the carbon black to the binder in the backing layer ranges from 1/0.5 to 1/3.5, particularly 1/0.8 to 1/3.0, by weight.

If the carbon black is incorporated in an amount corresponding to larger than the upper limit of the abovedescribed ratio, it tends to ooze out on the surface of the backing layer and to fall off in the form of dust, whereas if it is present in an amount smaller than the lower limit of the above-described ratio, increase in the coefficient of friction is observed.

In addition, lubricants which have been employed in conventional magnetic tapes may be applied to the backing layer of the present invention by incorporating them into the backing layer using a kneading technique, forming an overcoat containing them, or so on. Usually, the lubricants can be used in an amount of 0 to 10 parts by weight based on 100 parts by weight of the binder. In particular, if fatty acids containing 18 or more carbon atoms or esters thereof are employed as the lubricant, further improvement in sliding property upon tape-running can be made.

The ferromagnetic layer which can be employed in the present invention is made up of a magnetic coating composition which contains a ferromagnetic powder, such as Co-containing ferromagnetic iron oxide powder, ferromagnetic metal powders, etc., or a ferromagnetic metal thin film which can be formed using a vapor deposition technique such as vacuum evaporation, sputtering, ion plating or so on. In particular, ferromagnetic layers comprising Co-containing ferromagnetic iron oxide powders are advantageously employed.

Materials and processes for preparing the ferromagnetic layer which can be used in the present invnetion are described in U.S. Pat. No. 4,135,016.

The present invention will now be illustrated in more detail by reference to the following examples. However, the scope of the invention is not limited to the examples. In the following examples, all parts are by weight unless otherwise indicated.

EXAMPLE 1

On the surface of a 14 μm-thick polyethylene terephthalate film was provided a magnetic layer comprising Co-containing ferromagnetic iron oxide, and on the opposite side thereof was provided a backing layer in a dry thickness of 1 μm. The backing layer had the following composition, and mean grain sizes and addition amounts of carbon black powders employed therein were so changed from sample to sample as shown in Table 2. The samples prepared were designated No. 1 to No. 11.

| Coating Composition of Backing Layer | Parts |
| --- | --- |
| Nitrocellulose | 30 |
| Polyurethane (trade name: Nipporan 2301, produced by Nippon Polyurethane Co., Ltd.) | 10 |
| Polyisocyanate (trade name: Colonate L, produced by Nippon Polyurethane Co., Ltd.) | 20 |
| Carbon Black Powders (See Table 2 hereinafter) | |
| Methyl Ethyl Ketone | 480 |

EXAMPLE 2

On the surface of a 12 μm-thick polyethylene terephthalate film was provided a magnetic layer made up of Co-Ni alloy (Ni: 20 wt %) in a thickness of 0.15 μm using an inclined evaporation technique, and on the opposite side thereof was provided a backing layer having the same composition as described in Example 1. The samples obtained were designated No. 12 to No. 14.

Each of the thus obtained samples was subjected to various tests using the following processes, and the data determined thereby for the respective samples are set forth in Table 2.

Testing Processes

Running Durability

During both the maiden pass and the hundredth pass each sample was run at a speed of 3.3 cm/sec in a VHS type video deck. While running at this speed the tension of the sample at the entrance to the rotating cylinder of the video deck ($T_1$) and a tension at the exit thereof ($T_2$) was measured. Running durability was determined using the following equation.

$$\text{Running Durability} = T_2/T_1$$

(wherein $T_2$ was taken as 50 g)

Drop Out

The number of drop out generated in each sample after 100 passes was counted under the condition of 15 μ·sec/min using a drop-out counter "VD-3D" (made by Victor Company of Japan, Limited).

Color Signal to Noise Ratio (Color S/N)

A noise meter "925 C" (made by Shibasoku Co.) was used, and among the samples No. 1 to No. 11 the sample No. 1 was employed as the basic sample and the S/N value thereof was taken as 0 dB, whereas among the samples No. 12 to No. 14 the sample No. 12 was employed as the basic one and the S/N value thereof was taken as 0 dB. Thereafter, difference between a S/N value of each sample and that of the basic sample was determined.

Therein, measurement was carried out through a high frequency band pass filter (10 KHz, AM) and a low frequency band pass filter (500 KHz, AM). The VTR used was a "NV-8300" (made by Matsushita Electric Industrial Co., Ltd.).

TABLE 2

| Sample No. | Amount of Carbon Black (parts) | | | | P/B Ratio | $T_2/T_1$ at Initial Running | $T_2/T_1$ After 100 passes Running | Drop Out (15 μs) (number/min.) | Initial Color S/N (dB) |
|---|---|---|---|---|---|---|---|---|---|
| | Asahi #80 (23 mμ) | Asahi #60 (51 mμ) | Asahi #35 (116 mμ) | RAVENMT-P (280 mμ) | | | | | |
| 1 | 30 | — | — | — | 1/2 | 2.0 | 3.0 | 10 | 0 |
| 2 | — | 30 | — | — | 1/2 | 1.9 | 2.5 | 4 | −0.5 |
| 3 | — | — | 30 | — | 1/2 | 1.8 | 2.0 | 3 | −1.0 |
| 4 | — | — | — | 30 | 1/2 | 1.8 | 2.0 | 5 | −1.5 |
| 5 | 27 | — | — | 3 | 1/2 | 1.8 | 2.0 | 4 | −1.2 |
| 6 | 135 | — | 15 | — | 1/0.4 | 1.8 | 2.0 | 20 | −0.2 |
| 7 | 90 | — | 10 | — | 1/0.6 | 1.8 | 2.0 | 10 | 0 |
| 8 | 54 | — | 6 | — | 1/1 | 1.8 | 2.0 | 3 | 0 |
| 9 | 27 | — | 3 | — | 1/2 | 1.8 | 2.0 | 3 | 0 |
| 10 | 15.9 | — | 1.8 | — | 1/3.4 | 1.9 | 2.2 | 2 | 0 |
| 11 | 13.5 | — | 1.5 | — | 1/4 | 2.1 | 2.4 | 2 | 0 |
| 12 | 30 | — | — | — | 1/2 | 2.0 | 3.0 | 15 | 0 |
| 13 | — | — | 30 | — | 1/2 | 1.8 | 2.0 | 3 | −1.5 |
| 14 | 27 | — | 3 | — | 1/2 | 1.8 | 2.0 | 2 | 0 |

The data set forth in Table 2 clearly show that good results are obtained only when the backing layer contains the combination of fine-grained carbon black measuring 10 to 30 mμ in mean grain size and coarse-grained crbon black measuring 100 to 150 mμ in mean grain size and that, its P/B ratio ranges from 1/0.5 to 1/3.5.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support base; a magnetic recording layer on the surface side thereof; and a backing layer on the opposite side of the support containing carbon black and a binder, the backing layer having a thickness of 2 μm or less, the carbon black being composed of fine-grained carbon black having a mean grain size of 10 to 30 mμ and coarse-grained carbon black having a mean grain size of 100 to 150 mμ, the backing layer having a ratio of the content of the carbon black to that of the binder ranging from 1:0.5 to 1:3.5 by weight, wherein the ratio of the fine-grained carbon black to the coarse-grained carbon black is in the range og 99.5:0.5 to 50:50, and wherein the backing layer has a center line average roughness Ra of 0.024 μm or less under a cut-off condition of 0.08 mm.

2. A magnetic recording medium as claimed in claim 1, wherein the ratio of the fine-grained carbon black to the coarse-grained carbon black is in the range of 99:1 to 60:40.

3. A magnetic recording medium as claimed in claim 1, wherein the binder in the backing layer has a glass transition temperature (Tg) of 40° C. or more.

4. A magnetic recording medium as claimed in claim 3 wherein the binder in the backing layer has a glass transition temperature (Tg) of 60° C. or more.

5. A magnetic recording medium as claimed in claim 1, wherein the ratio of the content of the carbon black to that of the binder ranges from 1/0.8 to 1/3.0 by weight.

6. A magnetic recording medium as claimed in claim 1, wherein the thickness of the backing layer is 0.5 to 1.5 μm.

* * * * *